(12) United States Patent
Poulose et al.

(10) Patent No.: US 9,590,412 B2
(45) Date of Patent: Mar. 7, 2017

(54) SYSTEM FOR IMPROVING LIGHTNING IMMUNITY FOR A SOLID STATE POWER CONTROLLER

(71) Applicant: HONEYWELL INTERNATIONAL INC., Morristown, NJ (US)

(72) Inventors: Ezekiel Poulose, Chotanikara (IN); Vinod Kunnambath, Thrissur (IN); Prashant Purusmotham Prabhu K, Bangalore (IN); Narendra Rao, Bangalore (IN); Zhenning Liu, Missisauga (CA); Randy Fuller, Hillsburgh (CA)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 176 days.

(21) Appl. No.: 14/588,530

(22) Filed: Jan. 2, 2015

(65) Prior Publication Data
US 2016/0197465 A1  Jul. 7, 2016

(51) Int. Cl.
| H02H 3/20 | (2006.01) |
| H02H 9/04 | (2006.01) |
| H02H 1/04 | (2006.01) |
| H02H 3/08 | (2006.01) |
| H02H 7/22 | (2006.01) |
| H02H 1/00 | (2006.01) |
| H02H 3/22 | (2006.01) |

(Continued)

(52) U.S. Cl.
CPC ............ *H02H 1/04* (2013.01); *H02H 1/0069* (2013.01); *H02H 1/043* (2013.01); *H02H 3/08* (2013.01); *H02H 3/22* (2013.01); *H02H 7/22* (2013.01)

(58) Field of Classification Search
CPC ............ H02H 3/20; H02H 9/04; H02H 9/041
USPC ........................................................ 361/91.5
See application file for complete search history.

(56) References Cited

U.S. PATENT DOCUMENTS 7,443,309 B2 * 10/2008 Baldwin ................ H01H 83/04
340/514
8,059,378 B2  11/2011 Liu et al.
(Continued)

FOREIGN PATENT DOCUMENTS

CN  102830262 A  12/2012

OTHER PUBLICATIONS

European Search Report in EP Application No. 15201441.1 dated May 6, 2016.
(Continued)

*Primary Examiner* — Dharti Patel
(74) *Attorney, Agent, or Firm* — Shimokaji IP (57) ABSTRACT

A solid state power controller (SSPC) for an electrical power distribution system (EPDS), the SSPC may include a solid state switching device (SSSD) configured to interrupt current in a feeder line of the EPDS and a processing engine. A clamping device may be interposed between the feeder line and an electrical ground of the EPDS, An opto-coupler may be interposed between the processing engine and the clamping device. The opto-coupler may coupled to the clamping device to provide a lightning-detected signal to the processing engine only when a voltage drop develops across the clamping device. The processing engine may be constrained from commanding an alteration of state of the SSSD upon receiving the lightning-detected signal.

20 Claims, 4 Drawing Sheets

(51) Int. Cl.
*H02H 3/00* (2006.01)
*H02H 9/08* (2006.01)

(56) References Cited

U.S. PATENT DOCUMENTS

| | | | |
|---|---|---|---|
| 8,694,272 B2* | 4/2014 | Ewing | H04Q 9/00 361/622 |
| 2005/0018369 A1* | 1/2005 | Bax | H01H 83/14 361/42 |
| 2007/0201170 A1* | 8/2007 | Hooper | H02H 5/105 361/42 |
| 2008/0019070 A1 | 1/2008 | Kilroy | |
| 2009/0296298 A1* | 12/2009 | Divan | H02H 3/025 361/58 |
| 2010/0172063 A1* | 7/2010 | Liu | H02H 1/04 361/118 |
| 2011/0304942 A1 | 12/2011 | Rozman et al. | |
| 2013/0329329 A1 | 12/2013 | Liu | |
| 2014/0176336 A1 | 6/2014 | Li et al. | |
| 2014/0218201 A1 | 8/2014 | Meyer et al. | |
| 2014/0347768 A1* | 11/2014 | Batko | G01R 31/025 361/42 |
| 2015/0155700 A1* | 6/2015 | Alvarez Valenzuela | H03K 17/0822 361/93.9 |
| 2016/0181785 A1* | 6/2016 | Simonin | H02H 3/093 361/94 |

OTHER PUBLICATIONS

Nov. 3, 2014 opto isolator—Optocoupler input protection—Electrical Engineering Stack Exchange.
Solid Statements Protecting AC Output SSRs against voltage transient phenomena Jan. 2012.

* cited by examiner

SYSTEM FOR IMPROVING LIGHTNING IMMUNITY FOR A SOLID STATE POWER CONTROLLER

BACKGROUND OF THE INVENTION

The present invention relates to aircraft electric power distribution systems (EPDS) and methods for improving lightning strike immunity thereof and, more specifically, to apparatus and methods for preventing undesirable trips of a solid state power controller (SSPC).

Solid state power controllers (SSPC) are widely used in secondary electrical power distribution systems (SEPDS) in modern aircrafts due to their high reliability, "soft" switching characteristics, fast response time, and ability to facilitate advanced load management and other aircraft functions. Typically an SSPC is provided with over-current fault and arc fault detection and protection mechanisms to ensure the safety of the aircraft EPDS. One of the main challenges in designing the SSPC, which is mainly electronics circuitry based, is to ensure that its intended functions will not be upset by transients induced during lightning strikes. These lightning induced transients in load currents sometimes bear similar patterns to those resulting from arcs or over current faults.

A typical aircraft may be equipped with electrical distribution systems that are robust enough and suitably protected to tolerate lightning induced transients. Nevertheless, a lightning induced transient may cause tripping of an SSPC. In other words, the SSPC may experience a lightning-induced nuisance trip.

Nuisance trips of an SSPC are problematic because safety standards for aircraft operation require that an SSPC that is tripped during flight may be reset only after the aircraft is no longer in flight. Thus, even though an aircraft may endure in-flight lightning strikes without harm, there is the possibility that one or more of its electrical distribution circuits may become inoperative as a result of nuisance trips of one or more of its SSPCs.

As can be seen, there is a need for a system in which lightning-induced current surges may be differentiated from arcing and short circuit faults in an EPDS. More particularly, there is a need for a system in which tripping of an SSPC may be avoided if an overcurrent condition arises because of a lightning strike.

SUMMARY OF THE INVENTION

In one aspect of the present invention, a solid state power controller (SSPC) for an electrical power distribution system (EPDS), the SSPC may comprise: a solid state switching device (SSSD) configured to interrupt current in a feeder line of the EPDS; a processing engine; a clamping device interposed between the feeder line and an electrical ground of the EPDS; and an opto-coupler interposed between the processing engine and the clamping device, wherein the opto-coupler is coupled to the clamping device to provide a lightning-detected signal to the processing engine only when a voltage drop develops across the clamping device, wherein the processing engine is constrained from commanding an alteration of state of the SSSD upon receiving the lightning-detected signal.

In another aspect of the present invention, a lightning detection system for a solid state power controller (SSPC) of an electrical power distribution system (EPDS) may comprise: a lightning-protection clamping device interposed between a feeder line of the EPDS and an electrical ground of the EPDS; a sensor clamping device connected in series with the lightning-protection clamping device and interposed between the feeder line and the lightning-protection clamping device; and an opto-coupler connected in parallel with the sensor clamping device between an input side and an output side of the sensor clamping device, wherein the lightning protection clamping device has a first voltage rating, wherein the sensor clamping device has a second voltage rating lower than the first voltage rating.

In yet another aspect of the present invention, a method for avoiding a lightning-induced nuisance trip in a solid state power controller (SSPC) of an electrical power distribution system (EPDS) may comprise the steps of: producing light with a portion of a current surge arising from a lightning strike; detecting presence of the produced light to produce a lightning-detected signal; utilizing the lightning-detected signal to constrain the SSPC from tripping when a short circuit signal or arc fault signal develops in the SSPC within a predetermined time period before the production of the lightning-detected signal.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

The present invention generally provides a system for detecting occurrence of lightning-induced transients in an aircraft electric power distribution system (EPDS) and controlling operation of a solid state power control (SSPC) of the EPDS after occurrence of the lightning-induced transient. More particularly, the present invention may provide a system for reducing lightning-induced nuisance tripping of SSPCs.

Figure 1:
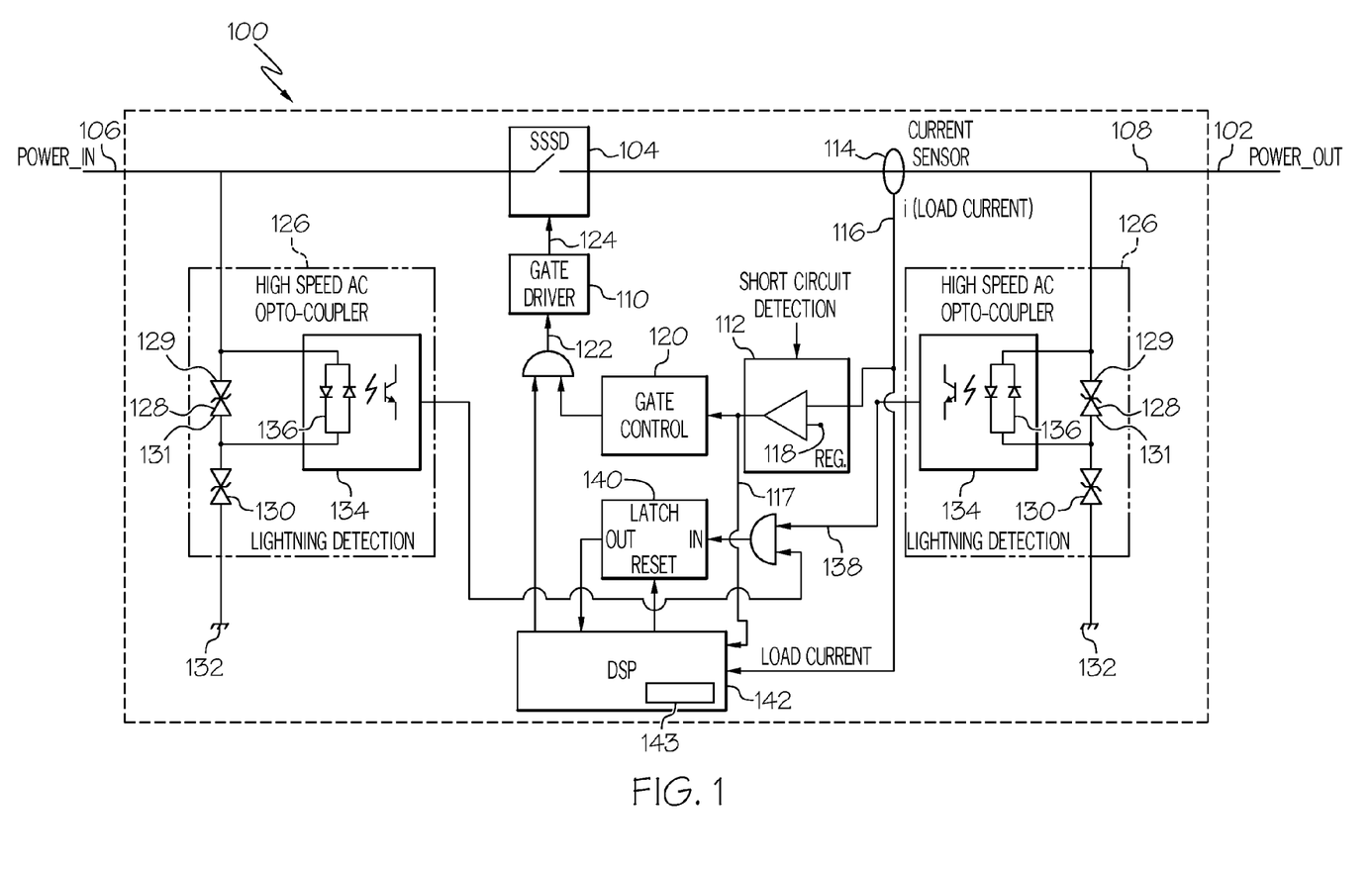
FIG. 1 is a schematic drawing of an aircraft solid state power controller (SSPC) with lightning detection features according to an exemplary embodiment of the present invention.

Referring now to FIG. 1, an exemplary embodiment of a solid state power controller (SSPC) 100 is shown interconnected to control power flow in a feeder line 102 of an EPDS (not shown). In the exemplary embodiment of FIG. 1, power flow may be AC power at nominal voltage of about 115 VAC. A solid state switching device (SSSD) 104 may be interposed between an input side 106 and an output side 108 of the feeder line 102. A gate driver 110 may be connected to a gate (not shown) of the SSSD 104 to alter the state of the SSSD 104. A short circuit detection unit 112 may be connected to a current sensor 114

A gate control block 120 may receive a short circuit indication signal 122 and translate it into a proper gating output 124 for the gate driver 110 of the SSSD 104. The SSPC 100 may be provided with lightning detection circuits 126 connected at the input side 106 and the output side 108 of the feeder line 102. The circuits 126 may perform a dual role of both protecting the EPDS from harmful effects of lightning strikes while also reliably determining if transient current surges in the feeder line 102 are a result of a lightning strike. In an exemplary embodiment, the lightning detection circuit 126 may include a low-voltage clamping device or sensor clamping device 128 and a lightning-protection clamping or high-voltage clamping device 130. The clamping devices 128 and 130 may be interposed between the feeder line 102 and an airframe electrical ground 132. The clamping 128 and 130 devices may be connected together in series with the sensor clamping device 128 being interposed between the feeder line 102 and the high-voltage clamping device 130. In the exemplary embodiment of FIG. 1 the clamping devices 128 and 130 may be bi-directional transient voltage suppression devices (TVS).

The selection of the collective or combined breakdown voltage of the series-connected TVS clamping devices 128 and 130 may be based on the principle that the combined breakdown voltage should be in a range between a maximum and a minimum value.

The minimum combined breakdown voltage should be greater than the maximum normal operational line voltage including normal transients that may develop in the the EPDS. Normal transients may include voltage spikes arising from normal operational activities of loads and circuits of the EPDS, such as disconnections of inductive loads. For example, in a 115 VAC system, MIL-STD-704E may be used as an aircraft power quality standard. In that case, maximum normal operational line voltage Vm, including normal transients, may be determined as follows:

$$Vm=(180\times1.414) \text{ (peak voltage)} \times (1+15\% \text{ (crest factor)})=292.7V,$$

where the crest factor may be selected to suit a particular operating environment for the EPDS. Thus, for a crest factor of 15%, combined breakdown voltages of the TVS clamping devices 128 and 130 may be selected to be at least 293V.

A maximum combined breakdown voltage should be as low as possible to minimize the stress level of the TVS clamping devices 128 and 130. For example, the maximum combined breakdown voltage should not exceed a maximum voltage rating of any circuit component or load connected between the feeder line 102 and the airframe electrical ground 132.

An opto-coupler 134 may be connected in parallel with the sensor clamping device 128 across an input side 129 and an output side 131. For compatibility with the opto-coupler 134, the clamping device 128 may have a clamping voltage of between about 9 V to about 12 V. Considering that the combined breakdown voltage of the clamping devices 128 and 130 of a 115 VAC EPDS may be at least 293V, it can be seen that the breakdown voltage of the high-voltage clamping device may be at least about 280V. Because the combined breakdown voltage of the clamping devices 130 and 128 is higher than the line voltage of the EPDS, both devices 130 and 128 will be in the non-breakdown (or high impedance) state during normal operation or normal transients of the EPDS. Therefore there will be no voltage drop across the clamping device 128. Consequently, diodes 136 of the opto-coupler 134 may remain in a non-conducting state during such normal conditions of the EPDS.

A processing engine 142 may be provided for load current sensing signal processing, arc fault detection, SSSD on/off control, and feeder wire protection. In an exemplary embodiment, the processing engine 142 may be a digital signal processor (DSP) and may be referred to herein as a DSP 142.

Figure 2:
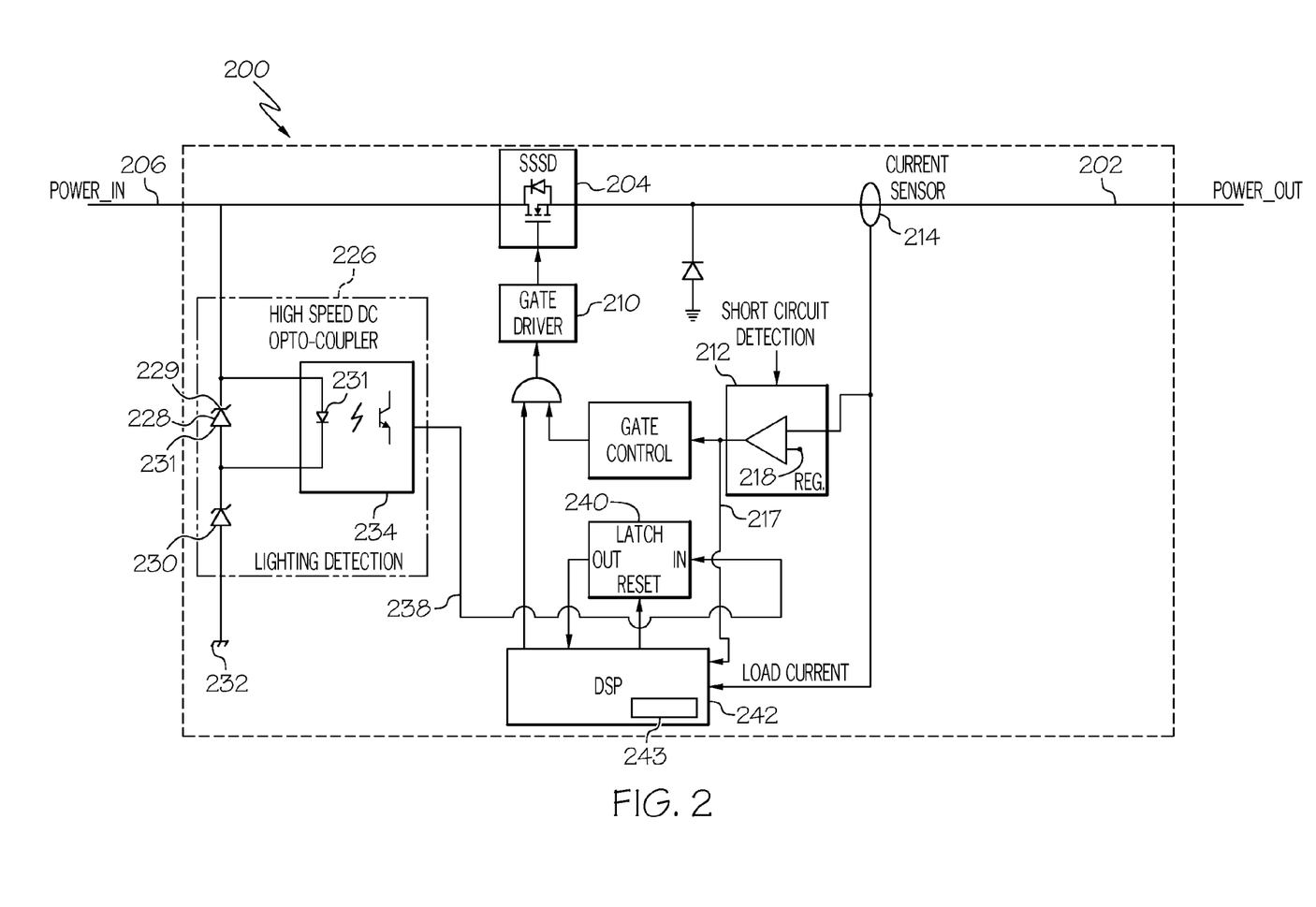
FIG. 2 is a schematic drawing of an aircraft solid state power controller (SSPC) with lightning detection features according to a second exemplary embodiment of the present invention.

Referring now to FIG. 2, a schematic diagram illustrates an exemplary embodiment of a DC solid state power controller (SSPC) 200 interconnected to control power flow in a feeder line 202 of an EPDS (not shown). In the exemplary embodiment of FIG. 2, power flow may be DC power at nominal voltage of about 28 VDC. A solid state switching device (SSSD) 204 may be positioned in the feeder line 202. A gate driver 210 may be connected to a gate (not shown) of the SSSD 204 to alter the state of the SSSD 204. A short circuit detection unit 212 may be connected to a current sensor 214

A gate control block 220 may receive a short circuit indication signal 222 and translate it into a proper gating output for the gate driver 210 of the SSSD 204. The SSPC 200 may be provided with a lightning detection circuit 226 connected at an input side 206 of the feeder line 202. The circuit 226 may perform a dual role of both protecting the EPDS from harmful effects of lightning strikes while also reliably determining if transient current surges in the feeder line 202 are a result of a lightning strike. In an exemplary embodiment, the lightning detection circuit 226 may include a low-voltage clamping device or sensor clamping device 228 and a lightning-protection clamping or high-voltage clamping device 230. In the exemplary embodiment of FIG. 2 the clamping devices 228 and 230 may be transient voltage suppression devices (TVS). In the case of a 28 VDC nominal line voltage, the high-voltage clamping device 230 may be sized to break down at a voltage greater than about 42 V, An opto-coupler 234 may be connected in parallel with the sensor clamping device 228 across an input side 229 and an output side 231. The clamping device 228 may have a clamping voltage of between about 9 V to about 12 V. A processing engine 242 may be provided for load current sensing signal processing, arc fault detection, SSSD on/off control, and feeder wire protection. In an exemplary embodiment, the processing engine 242 may be a digital signal processor (DSP) with an arc detection algorithm 243 and may be referred to herein as a DSP 242.

Figure 3:
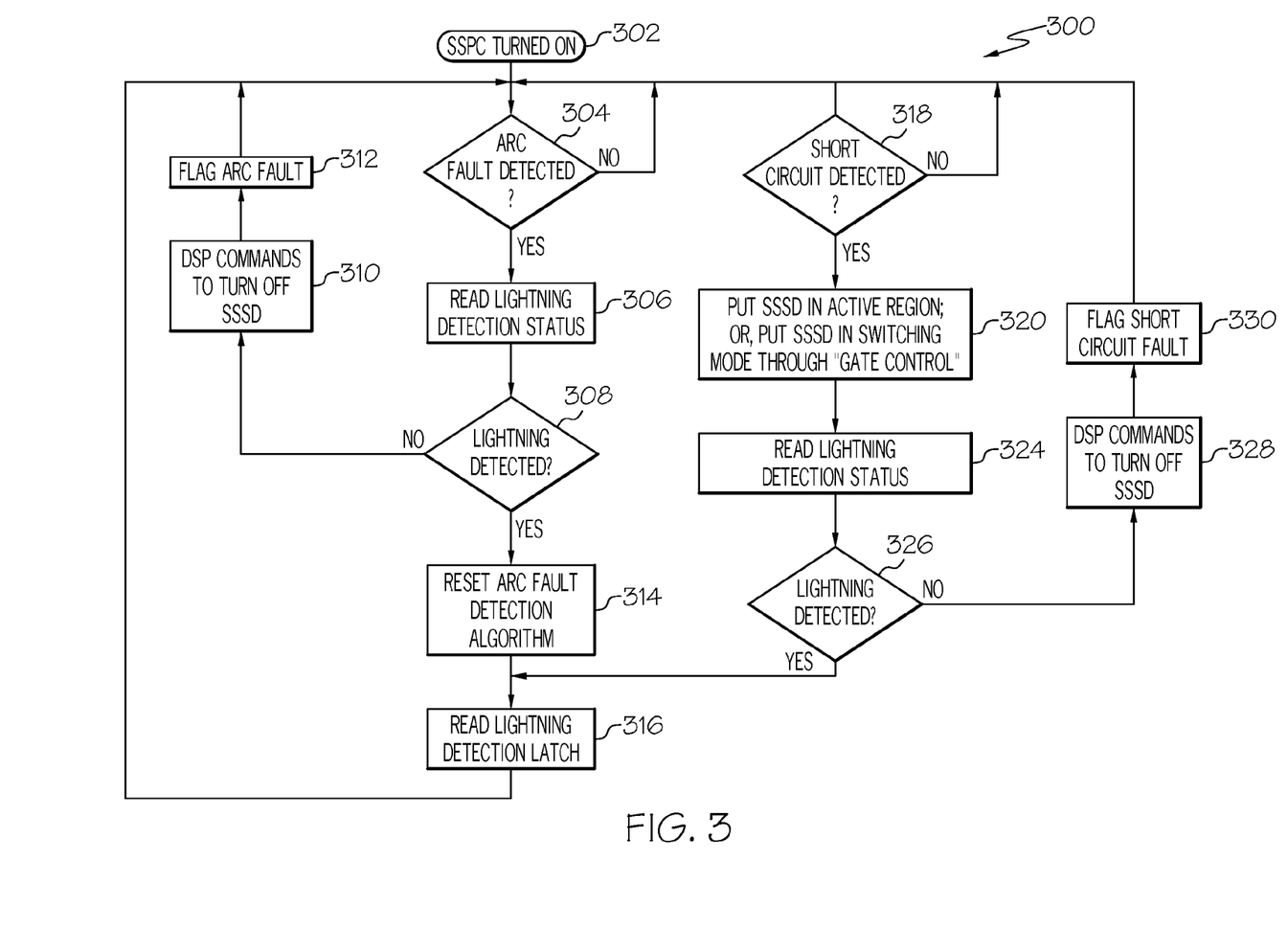
FIG. 3 is flow chart illustrating a method for operating the SSPC of FIG. 1 in accordance with an exemplary embodiment of the invention.

Referring now to FIG. 3, a flow chart illustrates an exemplary embodiment of a method 300 for operating the SSPC 100 or 200 so that lightning-induced nuisance trips may be avoided. During a lightning-strike-induced transient in the feeder line 102 or 202, voltage may rise above the nominal line voltage. Typically the line voltage during such a lightning-induced transient may go above the combined breakdown voltage of the sensor clamping device 128 or 228 and the high-voltage clamping device 130 or 230. Upon reaching the combined breakdown voltage, a substantial transitory current surge may occur in the line 102 or 202 as current passes through the clamping devices 128 or 228 and 130 or 230 to the airframe electrical ground 132 or 232, i.e., the electrical ground of the EPDS. Unless a transitory current surge is identified as one that is induced by lightning, the short circuit detection unit 112 or 212 might react to the current surge as if it were induced by a short circuit. The SSSD 104 or 204 might then be turned to an OFF state thereby irreversibly tripping the SSPC 100 or 200.

A lightning-induced transient current surge in the EPDS may be differentiated from a short-circuit fault or an arc fault in the EPDS because such faults may not raise line voltage above the maximum normal operational line voltage. But in cases of a lightning-induced transient, the SSSD 104 or 204 may be brought to active region which may interrupt the lightning current and allow the voltage to in the line 102 or 202 to rise. Upon reaching the break down voltage of the clamping devices 128 and 130 or 228 and 230, current may pass through the clamping devices to the airframe electrical ground 132 or 232, i.e., an electrical ground of the EPDS.

It may be seen that in a step 302, the SSPC 100 or 200 may be turned on (e.g., the SSSD 104 or 204 of the SSPC 100 or 200 may be in an ON state). In a step 304, an arc fault may be detected (e.g., The DSP 142 or 242 may receive load current sensing signal 116 or 216 from the current sensor 114 or 214 and analyze the signal 116 or 216 with an arc fault algorithm 143 or 243. The signal 116 or 216 may have a signature indicative of an arc fault condition). In a step 206, lightning detection status may be read. For example, the DSP 142 or 242 may read the state of the latching device 140 or 240 which state may have changed as a result of one or more of the lightning detection circuits 126 or 226 producing one or more lightning-detected signals 138 or 238. During a current surge in the EPDS, above the combined breakdown voltage of the sensor clamping devices 128 and 130 or 228 and 230, a voltage drop may develop across the sensor clamping device 128 or 228. Current may then pass through diodes 136 or 236 to drive the opto-coupler 134 or 234. In the case of a lightning-induced current surge the SSSD 104 or 204 can be brought to active region which interrupts the lightning current and allows the voltage to raise in the line 102 or 202 above the combined breakdown voltage of the sensor clamping devices 128 and 130 or 228 and 230. There may be sufficient current passing though the LED 136 or 236 to cause the LED 136 or 236 to light up thereby producing the lightning-detected signal 138 or 238. The signal 138 or 238 may be received by a latching device 140 or 240 which may change its state upon receiving the signal 138 or 238. It may be seen that the signal 138 or 238 may be produced only when a voltage drop develops across the clamping device 128 or 228

In a step 308, determination may be made as to whether or not a lightning-induced transient has occurred within a predetermined time duration from the time of the possible arc fault or short circuit, for example, within about 10 nanoseconds (ns) to about 100 ns. If, in step 308, there has been a determination that no such lightning-induced transient occurred then the method may proceed to a step 310 in which the DSP commands a turn off of the SSSD. In step 312 an arc fault may be flagged.

If, on the other hand, a determination is made that such a lightning-induced transient did occur within the predetermined time duration, then the method may proceed to steps 314 and 316. In step 314 an arc fault algorithm may be reset, (e.g., The algorithm 143 or 243 in the DSP 142 or 242 may be reset). In step 316, the lightning detection latching device may be reset (e.g., The latching device 140 or 240 may be reset by the DSP 142 or 242). The SSPC 100 or 200 may then remain untripped as in step 202. In that regard, the DSP 142 or 242 may be considered to be constrained from altering the state of the SSSD 104 or 204.

In a step 318, a short circuit may be detected. For example, the DSP 142 or 242 may receive a short circuit signal from the short circuit detection unit 112 or 212 which may monitor the amplitude of the load current and produce an indication signal when the load current exceeds a predetermined trip level (e.g., a short circuit fault situation). This may realized by converting an instantaneous load current sensing signal 116 or 216 into a short circuit trip signal 117 or 217 by comparing it with a preset voltage reference 118 or 218. In a step 320, the SSSD 104 or 204 may be commanded to limit load current by either forcing the SSSD 104 or 204 to operate in an active region, or putting the SSSD 104 or 204 in a switching mode. The SSSD 100 or 200 may be commanded to operate in the mode of step 220 for a time period as least as long as may be required to determine if a lightning-induced transients has occurred within the predetermined time duration of about 10 ns to about 100 ns.

In steps 324 and 326 determination of whether a lightning-induced transient has occurred may be performed in the same manner as in steps 306 and 308. Step 316 may be performed if it is determined that a lightning-induced transient did occur within about 10 ns to 100 ns of a perception of a short circuit. In that case, the latching device may be reset and the SSSD 104 or 204 may be commanded to remain in an ON state as in step 302. In the event that step 326 yields a no-lightning determination, a step 328 may proceed in which the SSSD 104 or 204 may be commanded to enter an OFF state thus tripping the SSPC 100. In a step 330 a short circuit may be flagged.

Figure 4:
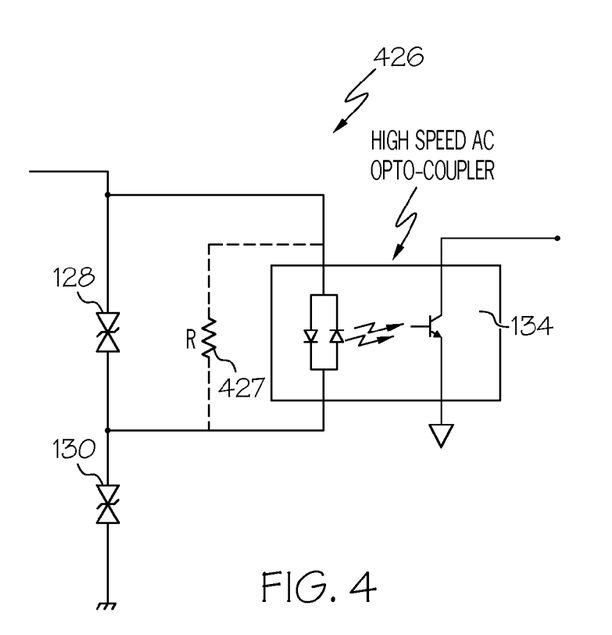
FIG. 4 is a schematic diagram of a portion an alternate embodiment of an SSPC according to an exemplary embodiment of the present invention.

Referring now to FIG. 4, a schematic diagram illustrates features of an alternate exemplary embodiment of the SSPC 100 in which additional noise immunity can be achieved. A lightning detection circuit 426 may include a resistor 427 connected in parallel with one of the opto-couplers 134. The resistance value of the resistor 427 may be small enough so that current passing thought the opto-coupler 134 is insufficient to produce an output from the opto-coupler 134 when the current passing through the resistor 427 is produced only by noise and not by a lightning-induced surge.

Figure 5:
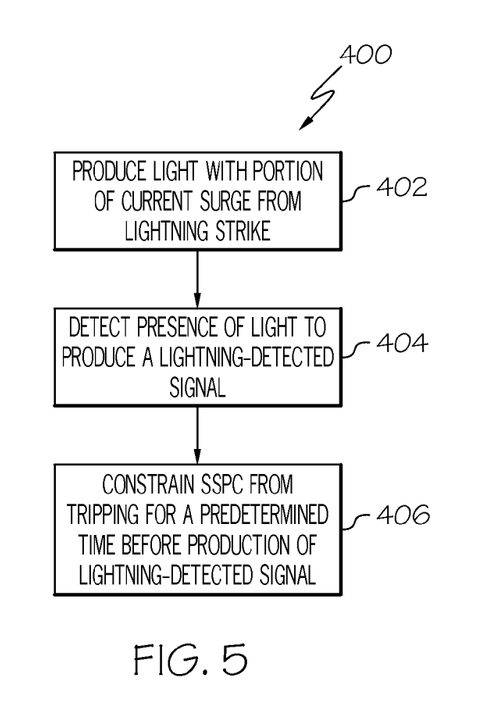
FIG. 5 is a flow chart of a method for avoiding lightning-induced nuisance trips according to an exemplary embodiment of the present invention.

Referring now to FIG. 5, a flow chart illustrates a method 400 for avoiding lightning-induced nuisance trips in a solid state power controller (SSPC) of an electrical power distribution system (EPDS).

In a step 402, light may be produced with a portion of a current surge arising from a lightning strike, (e.g., A lightning-induced current surge may be directed to an electrical ground of the EPDS through a lightning protection clamping device 130. The clamping device 130 may reach its break down voltage and current may pass from the feeder line 102 to the ground 132. A portion of said current surge may be passed through LEDs 136 of the opto-coupler 134 thereby producing light. The light may be produced at a voltage that corresponds to a breakdown voltage of the sensor clamping device 128). In a step 404, a lightning-detected signal may be produced by the opto-coupler (e.g., the opto-coupler 134 may produce the lightning-detected signal 138 which signal may be manifested as a light-detected signal). In a step 406, the lightning-detected signal may be utilized to constrain the SSPC from tripping when a short circuit signal or arc fault signal develops in the SSPC within a predetermined time period before the production of the light-detected signal.

It should be understood, of course, that the foregoing relates to exemplary embodiments of the invention and that modifications may be made without departing from the spirit and scope of the invention as set forth in the following claims.

We claim:

1. A solid state power controller (SSPC) for an electrical power distribution system (EPDS), the SSPC comprising:
    a solid state switching device (SSSD) configured to interrupt current in a feeder line of the EPDS;
    a processing engine;
    a clamping device interposed between the feeder line and an electrical ground of the EPDS; and
    an opto-coupler interposed between the processing engine and the clamping device,
    wherein the opto-coupler is coupled to the clamping device to provide a lightning-detected signal to the processing engine only when a voltage drop develops across the clamping device,
    wherein the processing engine is constrained from commanding an alteration of state of the SSSD upon receiving the lightning-detected signal.

2. The SSPC of claim 1 further comprising
    a short circuit detection unit coupled to the processing engine, the short circuit detection unit configured to provide a short circuit trip signal to the processing engine in the event of a current surge through the feeder line in excess of a predetermined magnitude and duration; and
    wherein the processing engine is configured to provide a command to the SSSD to alter the state of the SSSD to an OFF state upon receiving the short circuit trip signal and upon also not receiving the lightning-detected signal within a predetermined duration after receiving the short circuit signal.

3. The SSPC of claim 2 wherein the predetermined duration is less than about 100 nanoseconds (ns).

4. The SSPC of claim 3 further comprising:
    an arc fault detection algorithm within the processing engine and configured to provide an arc fault signal to the processing engine in the event of a variation in current through the feeder line, the variation being consistent with arc fault characteristics,
    wherein the processing engine is configured to provide a command to the SSSD to alter the state of the SSSD to an OFF state upon receiving the arc fault signal and upon also not receiving the lightning-detected signal within the predetermined duration after receiving the arc fault signal.

5. The SSPC of claim 1:
    wherein the clamping device is coupled with a second clamping device;
    wherein the second clamping device is interposed between the clamping device and the electrical ground; and
    wherein the clamping device and the second clamping device in combination have a total breakdown voltage that is greater than a maximum normal operational line voltage including normal transients of the EPDS.

6. The SSPC of claim 5 wherein the clamping device is a low voltage clamping device with a breakdown voltage rating of about 9 volts to about 12 volts.

7. The SSPC of claim 1 wherein the opto-coupler is coupled to the clamping device so that light-emitting diodes (LED) of the opto-coupler are connected in parallel with the low voltage clamping device.

8. The SSPC of claim 7 wherein the low voltage clamping device and the second clamping device are transient voltage suppressors (TVS).

9. The SSPC of claim 7 wherein the opto-coupler has a rise time rating between about 10 nanoseconds (ns) to about 100 ns.

10. A lightning detection system for a solid state power controller (SSPC) of an electrical power distribution system (EPDS) comprising:
    a lightning-protection clamping device interposed between a feeder line of the EPDS and an electrical ground of the EPDS;
    a sensor clamping device connected in series with the lightning-protection clamping device and interposed between the feeder line and the lightning-protection clamping device; and
    an opto-coupler connected in parallel with the sensor clamping device between an input side and an output side of the sensor clamping device,
    wherein the lightning-protection clamping device has a first breakdown voltage rating,
    wherein the sensor clamping device has a second breakdown voltage rating lower than the first breakdown voltage rating.

11. The lightning detection system of claim 10 wherein the opto-coupler has a rise time rating between about 10 nanoseconds (ns) to about 100 ns.

12. The lightning detection system of claim 10 wherein the sensor clamping device has a breakdown voltage rating of about 9 Volts to about 12 volts.

13. The lightning detection system of claim 10 wherein the lightning-protection clamping device and the sensor clamping device in combination have a total breakdown voltage rating that is greater than a maximum normal operational line voltage including normal transients of the EPDS.

14. The lightning detection system of claim 10 further comprising a resistor connected in parallel with the sensor clamping device between the input side and the output side of the sensor clamping device, the resistor being interposed between the sensor clamping device and the opto-coupler.

15. The lightning detection system of claim 14 wherein the resistance value of the resistor is small enough so that current passing through the opto-coupler is insufficient to produce an output from the opto-coupler when the current passing through the resistor is produced by noise and not by a lightning-induced surge.

16. The lightning detection system of claim 10 wherein the sensor clamping device and the lightning-protection clamping device are transient voltage suppressors (TVS).

17. A method for avoiding a lightning-induced nuisance trip in a solid state power controller (SSPC) of an electrical power distribution system (EPDS) comprising the steps of:
    producing light with a portion of a current surge arising from a lightning strike;
    detecting presence of the produced light to produce a lightning-detected signal; and
    utilizing the lightning-detected signal to constrain the SSPC from tripping when a short circuit signal or arc fault signal develops in the SSPC within a predetermined time period before the production of the lightning-detected signal.

18. The method of claim 17:
wherein the lightning-detected signal is generated within a time period no greater than about 100 nanoseconds (ns) after the lightning strike; and
wherein the predetermined time period is no greater than 100 ns.

19. The method of claim 17 further comprising the step of limiting the line voltage of the EPDS during lightning strikes to a voltage that is no greater than the maximum voltage rating of any circuit component or load connected to the EPDS.

20. The method of claim 19 wherein the step of producing light occurs at a voltage that is between about 9 V and about 12 V.

\* \* \* \* \*